US008874292B2

(12) United States Patent
Yamazaki et al.

(10) Patent No.: US 8,874,292 B2
(45) Date of Patent: Oct. 28, 2014

(54) ENGINE START FOR A HYBRID ELECTRIC VEHICLE

(75) Inventors: Mark Steven Yamazaki, Canton, MI (US); Francis Thomas Connolly, Ann Arbor, MI (US); Bernard D. Nefcy, Novi, MI (US); Daniel Scott Colvin, Farmington Hills, MI (US); Walter Joseph Ortmann, Saline, MI (US); Christopher Alan Lear, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 13/465,167

(22) Filed: May 7, 2012

(65) Prior Publication Data

US 2013/0297105 A1 Nov. 7, 2013

(51) Int. Cl.
*B60K 6/387* (2007.10)
*B60W 20/00* (2006.01)

(52) U.S. Cl.
CPC ............... *B60K 6/387* (2013.01); *B60W 20/00* (2013.01); *B60W 20/40* (2013.01)
USPC ......................................... 701/22

(58) Field of Classification Search
CPC .................................................. B60W 20/00
See application file for complete search history.

(56) References Cited

U.S. PATENT DOCUMENTS

| 7,370,715 | B2 | 5/2008 | Colvin et al. |
| 7,896,114 | B2 * | 3/2011 | Colvin et al. ............. 180/65.28 |
| 8,112,208 | B2 | 2/2012 | McGee et al. |
| 2011/0070999 | A1 * | 3/2011 | Soliman et al. ................... 477/3 |
| 2011/0077830 | A1 | 3/2011 | Lochocki, Jr. et al. |
| 2011/0301791 | A1 | 12/2011 | Swales et al. |
| 2012/0010792 | A1 | 1/2012 | Nedorezov et al. |

* cited by examiner

*Primary Examiner* — John Q Nguyen
*Assistant Examiner* — Michael Kerrigan
(74) *Attorney, Agent, or Firm* — David B. Kelly; Brooks Kushman P.C.

(57) ABSTRACT

A hybrid vehicle has an engine, an electric machine connected to the engine by an upstream clutch, a transmission gearbox connected to the electric machine by a downstream clutch, and a controller. The controller is configured to start the engine using one of a plurality of start sequences that control the electric machine, the upstream and downstream clutches. The engine start sequence is selected based on transmission gearbox input speed and a driver demand input. A method of controlling a hybrid vehicle is provided. An engine is selectively coupled to an electric machine by an upstream clutch with the electric machine selectively coupled to a transmission gearbox by a downstream clutch. The engine is started using a control sequence to control the electric machine, upstream clutch, and downstream clutch. The control sequence is determined by a vehicle state based on transmission gearbox input speed and a driver demand input.

18 Claims, 6 Drawing Sheets

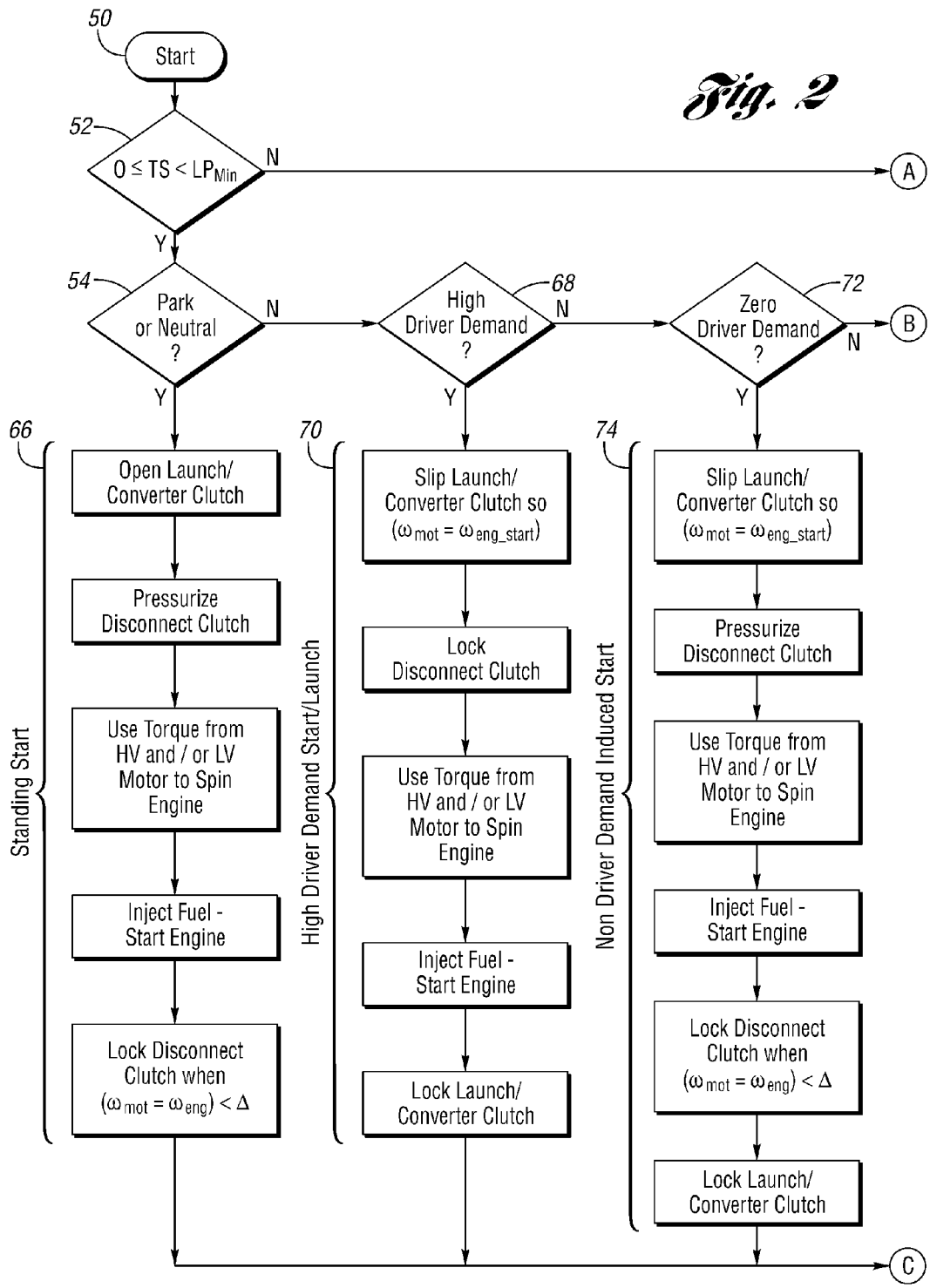

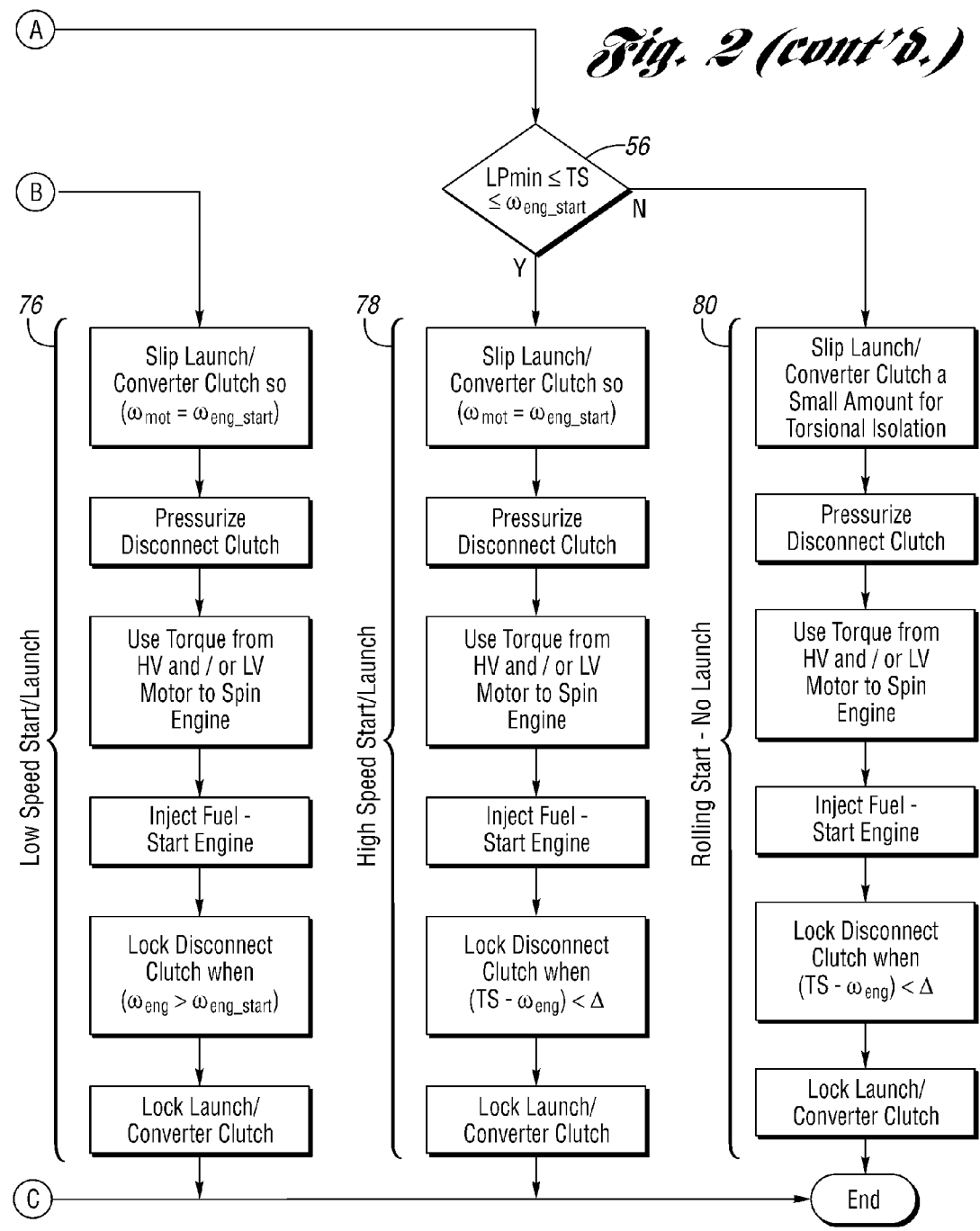

ENGINE START FOR A HYBRID ELECTRIC VEHICLE

TECHNICAL FIELD

Various embodiments relate to a hybrid electric vehicle and a method for controlling the vehicle during an engine start event.

BACKGROUND

Hybrid electric vehicles (HEV's) utilize a combination of an internal combustion engine with an electric motor to provide the power needed to propel a vehicle. This arrangement provides improved fuel economy over a vehicle that has only an internal combustion engine. Clutches may be used to control the power flow and during transient vehicle operations, such as pulling up the engine or the electric motor, to provide smooth operation for the driver.

For example, the engine may be shutdown in an HEV during times that the engine operates inefficiently, or is not otherwise needed to propel the vehicle. In these situations, the electric motor is used to provide all of the power needed to propel the vehicle. When the driver power demand increases such that the electric motor can no longer provide enough power to meet the demand, if the battery state of charge (SOC) drops below a certain level, or another vehicle system requires engine operation, the engine may need to start to provide additional power for the vehicle. Depending on the state of the vehicle, it may be desirable to start the engine using various control sequences with the powertrain, i.e. the engine, motor, transmission, etc., to meet the vehicle and driver requirements at the time. Therefore, a need exists for a hybrid vehicle, and a method for controlling engine start events in the vehicle, based on the present vehicle state and driver demand for the vehicle.

SUMMARY

In an embodiment, a hybrid vehicle is provided with an engine, an electric machine connected to the engine by an upstream clutch, a transmission gearbox connected to the electric machine by a downstream clutch, and a controller. The controller is configured to start the engine using one of a plurality of start sequences that control the electric machine, the upstream clutch, and the downstream clutch. The engine start sequence is selected based on transmission gearbox input speed and a driver demand input.

In another embodiment, a method for controlling a hybrid vehicle is provided. The hybrid vehicle has an engine selectively coupled to an electric machine by an upstream clutch. The electric machine is selectively coupled to a transmission gearbox by a downstream clutch. The engine is started using a control sequence to control the electric machine, upstream clutch, and downstream clutch. The engine control sequence is determined by a vehicle state based on transmission gearbox input speed and a driver demand input.

In yet another embodiment, a computer readable medium having stored data representing instructions executable by a controller to control a hybrid vehicle is provided with instructions for measuring an input speed to a transmission gearbox and comparing the input speed to a threshold, instructions for receiving a driver demand input, instructions for receiving an engine start request, and instructions for starting an engine using a control sequence by controlling an electric machine, an upstream clutch, and a downstream clutch. The engine start control sequence is determined by a vehicle state based on the input speed and the driver demand input.

Various embodiments according to the present disclosure have associated advantages. For example, embodiments according to the present disclosure provide for controlling an engine start in a hybrid vehicle. A control system uses existing conditions in the vehicle and the driver command or intent to determine the control sequence or type of engine start that meets the vehicle requirements at the time. The control system then command and controls the various driveline components in the vehicle to start the engine, blend that various power sources, and operate the vehicle.

BRIEF DESCRIPTION OF THE DRAWINGS

FIG. 2 is a flow chart illustrating a method of starting an engine in the vehicle of FIG. 1.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
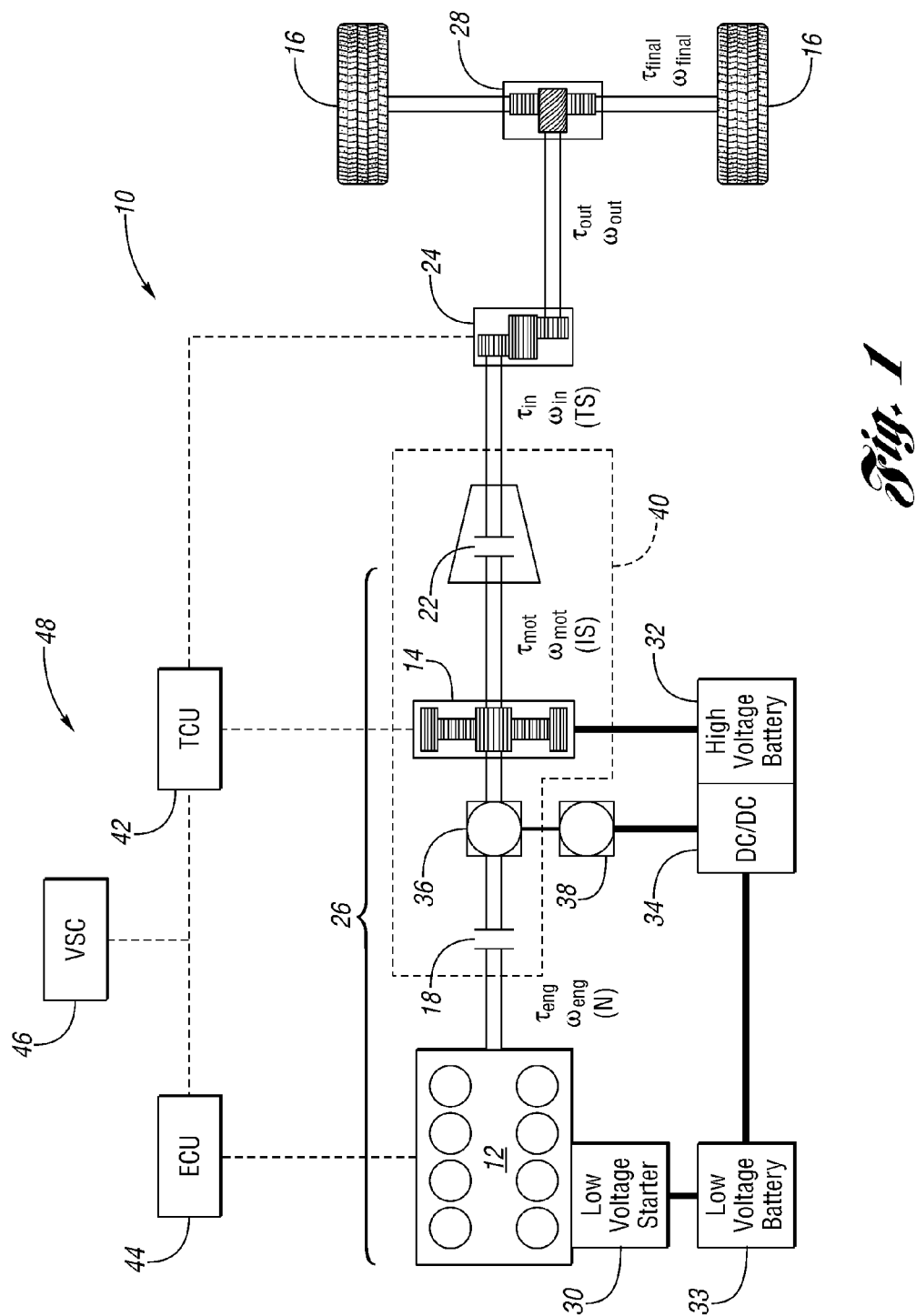
FIG. 1 is a hybrid vehicle according to an embodiment.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. The clutch 18 may also include a damper mechanism such as a series of plates and springs configured to help dampen changes in torque transferred between the engine 12 and the M/G 14 when the disconnect clutch 18 is being engaged. A second clutch 22, also known as a launch clutch or the downstream clutch, connects the M/G 14 to a transmission 24, and all of the input torque to the transmission 24 flows through the launch clutch 22. The launch clutch 22 may be controlled to isolate the driveline 26, which includes the M/G 14 and the engine 12, from the transmission 24, differential 28 and the vehicle drive wheels 16. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch.

The engine 12 output shaft is connected to the disconnect clutch 18, which in turn is connected to the input shaft for the input shaft to the M/G 14. The M/G 14 output shaft is connected to the launch clutch 22, which in turn is connected to the transmission 24. The components of driveline 26 of the vehicle 10 are positioned sequentially in series with one another.

For another embodiment of the vehicle, the downstream clutch 22 is a torque converter with a bypass clutch. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the downstream clutch device 22. The torque converter may also include a one way clutch.

The engine 12 is a direct injection engine. Alternatively, the engine 12 may be a another type of engine or prime mover, such as a port injection engine or fuel cell, or use various fuel sources, such as diesel, biofuel, natural gas, hydrogen, or the like.

In some embodiments, the engine 12 is started using the M/G 14 to rotate the engine 12 using torque provided through clutch 18. Alternatively, the vehicle 10 includes a starter motor 30 operatively connected to the engine 12, for example, through a belt or gear drive. The starter motor 30 may be used to provide torque to start the engine 12 without the addition of torque from the M/G 14. This isolates the M/G 14 during engine 12 start and may eliminate or reduce torque disturbances that would otherwise occur when torque was transferred from the M/G 14 to the engine 12 to assist the engine start.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. In one example the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery 33 may also be present to provide power to the starter motor or other vehicle components, and may be connected to battery 32 by a DC to DC converter 34.

In some embodiments, the transmission 24 is an automatic transmission and connected to the drive wheels 16 in a conventional manner, and may include a differential 28. The vehicle 10 is also provided with a pair of non-driven wheels; however, in alternative embodiments, a transfer case and a second differential may be utilized in order to positively drive all of the vehicle wheels.

The transmission 24 has a gear box to provide various gearing ratios for the vehicle 10. The transmission 24 gearbox may include clutches and planetary gearsets, or other arrangements of clutches and gear trains as are known in the art. Pressurized fluid for the transmission is provided by a main transmission pump 36. The main transmission pump 36 is connected to or adjacent to the M/G 14 such that it rotates with the M/G 14 and the driveshaft to pressurize and provide transmission fluid. When the portion of the driveline 26 containing the main transmission pump 36 is at rest, the pump 36 is also at rest and is inactive. The portion of the driveline 26 adjacent to the main pump 36 needs to have a rotational speed above a threshold value, $LP_{min}$, for the main pump 36 to become operational. The threshold value is discussed further below.

In order to provide pressurized transmission fluid when the main pump 36 is inactive, an auxiliary pump 38 is also provided. The auxiliary pump 38 may be electrically powered, for example by battery 32. In some embodiments, the auxiliary pump 38 provides a portion of the transmission fluid for the transmission 24 such that the transmission 24 is limited in operation, for example to certain actuators or gearing ratios, when the auxiliary pump 38 is operating.

The M/G 14, the clutches 18, 22, and a main transmission pump 36 may be located within a motor generator case 40, which may be incorporated into the transmission 24 case, or alternatively, is a separate case within the vehicle 10.

The transmission 24 is controlled using a transmission control unit (TCU) 42 to operate on a shift schedule, such as a production shift schedule, that connects and disconnects elements within the gear box to control the ratio between the transmission output and transmission input. The TCU 42 may change the shift schedule or transmission 24 operation when the main pump 36 or the auxiliary pump 38 is operational. The TCU 42 also acts to control the M/G 14, the clutches 18, 22, and any other components within the motor generator case 40.

An engine control unit (ECU) 44 is configured to control the operation of the engine 12. A vehicle system controller (VSC) 46 transfers data between the TCU 42 and ECU 44 and is also in communication with various vehicle sensors and driver inputs. The control system 48 for the vehicle 10 may include any number of controllers, and may be integrated into a single controller, or have various modules. Some or all of the controllers may be connected by a controller area network (CAN) or other system. The control system 48 may be configured to control operation of the various components of the transmission 24, the motor generator assembly 14, the starter motor 30 and the engine 12 under any of a number of different conditions, including determining a start sequence for the engine 12 and implementing the start sequence.

Under normal powertrain conditions (no subsystems/components faulted), the VSC 46 interprets the driver's demands (e.g. PRND and acceleration or deceleration demand), and then determines the wheel torque command based on the driver demand and powertrain limits. In addition, the VSC 46 determines when and how much torque each power source needs to provide in order to meet the driver's torque demand and to achieve the operating point (torque and speed) of the engine.

Although the operation of the clutches 18, 22 described uses the term "pressure", thereby implying a hydraulic clutch, other types of devices, such as electromechanical clutches or torque converters may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 18, 22 described herein are in terms of "pressure", though it is understood that it also includes situations where a non-hydraulic force is applied to the clutch plates in a non-hydraulic clutch.

When one of the clutches 18, 22 is locked or engaged, the rotational speeds of the driveline components on either side of the clutch are the same. Slip is the speed difference from one side of a clutch to other, such that when one of the clutches is slipping, one side has a different speed than the other. For example, if the M/G 14 output rotational speed is at 1500 rpm and the launch clutch 22 is slipping 100 rpm, the transmission 24 side of the launch clutch is at 1600 rpm. When the downstream clutch 22 is a bypass clutch for a torque converter, it may be considered to be slipping when it is fully open since there is a speed differential across the clutch, even when no torque is being transferred through the bypass clutch.

The speed (and torque of torque producers) on one side of the clutch may vary and be disturbed, and when the clutch is slipping, the other side of the clutch is isolated and receives the torque based on the torque capacity of the clutch (i.e. the driveline 26 torque may vary and the transmission 24 and wheels will receive a constant torque through the clutch 22).

For example, when the launch clutch 22 is at its clutch capacity for a given pressure, i.e. the stroke pressure, the clutch piston or the clutch plates are just at the point of contact. At the stroke pressure, the clutch 22 is barely slipping, and it is ready to be quickly engaged. In this way, the driveline 26, including the engine 12 and the M/G 14, is ostensibly isolated from the transmission 24 and drive wheels 16, and the vehicle occupants will not be subject to torque disturbances resulting from torque being transferred between the M/G 14 and the engine 12 when connecting the engine 12 to the M/G 14 using the disconnect clutch 18, such as during engine 12 start.

When the vehicle 10 is being operated it may experience a series of situations and driving conditions that can be termed use cases, or operating conditions. Use cases categorize various driver commands (e.g., accelerator pedal position, brake pedal position, gear lever, etc.) and vehicle conditions (vehicle speed, clutch states, gear ratios, etc.) into groupings that may be recognized by the control system 48. The vehicle 10 has a number of use cases that result in an engine 12 start and operation. For example, one use case has the vehicle 10 stationary with the gear lever in drive and the brake engaged, and the VSC 46 may request an engine 12 start because the battery 32 state of charge (SOC) has reached a low threshold. In another example, the vehicle 10 is in motion in an electric-only mode at a steady speed (with engine 12 disconnected and off) and the accelerator pedal has a tip-in, and the VSC 46 determines that the additional power request requires an engine start. There are other use cases that do not involve an engine start. The use cases described herein are for example and are non-limiting. Different engine 12 start use cases may occur in similar conditions to one other or in differing conditions. Based on the use case, the VSC 46 may determine a start sequence for the engine 12. There are various start sequences for the engine 12 that correspond to one or more use cases. For each start sequence, there are a number of control actuator commands and sequences that may be used to start the engine 12 while meeting criteria related to the use case.

For example, some use cases involve starting the engine 12 while the launch clutch 22 (or torque converter with a lock out or bypass clutch) is open, slipping, or engaged. Differing states of the launch clutch 22 require different engine 12 start sequences. Engine 12 start sequences are differentiated based upon how various actuators and inputs, such as the M/G 14, engine 12, starter motor 30, and clutches 18, 22, are operated and controlled to achieve the desired start. Driver inputs and information, such as gear lever and driver demanded torque, as well as actuator information such as transmission input and output speed provide the use case and are used to determine which start sequence to use.

An algorithm may be provided within the control system 48 that determines the engine 12 start sequence for a given use case, or a set of vehicle and driver conditions, to start the engine 12 while the vehicle 10 is stationary or rolling. In one embodiment, the algorithm is based on the state of the launch clutch 22, the transmission 24 input speed ($\omega_{in}$), and the driver intent as determined through various driver inputs to the vehicle 10. The actuator operation during each start sequence is defined, and the criteria for determining which start sequence to use is explained with reference to FIGS. 2-5.

For the vehicle 10 as shown in FIG. 1, there are various methods of start sequences to start the engine 12. In one sequence, the disconnect clutch 22 is open and the start motor 30 is used to start the engine 12. In another sequence, the M/G 14 is used to pull up or rotate the engine 12, and once the engine 12 has a designated speed, the engine 12 is fueled and combustion begins. In yet another sequence, both the M/G 14 and the starter motor 30 are used in tandem to start the engine 12. In another sequence, the disconnect clutch 18 is engaged so that the M/G 14 may pull up or start the engine 12 while fueling the engine 12 (combustion enabled). The clutch 18 is opened once combustion begins in the engine 12, and the engine 12 brings itself to a synchronous speed with the driveline 26 and the rotational input speed ($\omega_{in}$) of the transmission 24. Then the clutch 18 is engaged so that the engine 12 provides torque.

The vehicle 10 may be in one of several use cases or operational states when the control system 48 determines that an engine 12 start is needed. In one use case, the vehicle 10 is stationary with the gear lever in park or neutral. In another use case, the vehicle 10 is stationary with gear lever in drive, low, or reverse, and the brake is engaged. In yet another use case, the vehicle 10 is creeping, or is at an idle or at a very slow speed for the vehicle 10 with no accelerator pedal input and no brake input. In another use case, the vehicle 10 is launching, such as when the vehicle 10 is going from stationary to some designated driving speed. The engine 12 may be needed to transfer torque to meet driver demand. If the vehicle 10 has a traditional clutch 22, there is clutch 22 control, i.e. slipping. If the vehicle 10 has a torque converter 22, there may be torque multiplication during launch. During launch, the input speed to the transmission 24, $\omega_{in}$, is less than the minimum speed at which the engine 12 may be started which impacts the start sequence used. In yet another use case, the vehicle 10 is driving, such as when the vehicle is operating and moving along a road or highway, and the input speed to the transmission 24, $\omega_{in}$, is greater than the minimum speed at which the engine 12 may be started which also impacts the start sequence used.

Various driver inputs, or driver intent cases, may be used by the control system 48. The driver may intend the vehicle to move, but not use the accelerator pedal, such as during creep. The driver may have a low or normal driver demand, such as with a partially depressed accelerator pedal. The driver may also have a high driver demand, such as wide open throttle or near wide open throttle, with a depressed accelerator pedal. Note that other driver intent cases include braking inputs, gear selector inputs, and the like.

For the examples below, the vehicle speed (VS) condition is specified in terms of corresponding turbine speed (TS), which correlates to the input speed to the transmission 24 ($\omega_{in}$), assuming the transmission 24 is in a particular gear. For the launching conditions as described, the transmission 24 may be assumed to be in first gear. For rolling conditions the transmission 24 may be other gears. The relationship between VS and TS is as follows:

$$TS = ratio_{gear} \times ratio_{final\_drive} \times conversion_{wheel\_to\_shaft\_speed} \times VS.$$

An algorithm for various use cases and start sequences for use by the control system 48 is shown as a flowchart in FIG. 2. The algorithm first determines the use case, and then the type of start sequence to be executed to meet the current vehicle 10 conditions and driver intent or demand. Once a use case and corresponding start sequence is determined, then the components of the vehicle drivetrain 26 are controlled based on the start sequence. In FIG. 2, TS is the turbine speed, or gearbox input speed, $\omega_{in}$ (see FIG. 1). $LP_{min}$ is the minimum main pump 36 speed needed to provide sufficient line pressure for full operation of the transmission 24. The pump 36 is driven by the rotating driveline 26, and in the embodiment shown in FIG. 1, $LP_{min}$ correlates to the speed of the M/G 14 adjacent to the pump 36. For example, when the impeller speed (IS) is less than $LP_{min}$, the auxiliary pump 38 is needed to provide fluid to the transmission 24. The engine 12 speed is $\omega_{eng}$, or N. The M/G 14 speed is $\omega_{mot}$, or IS. The minimum speed for an engine start is $\omega_{eng\text{-}start}$. A small calibrateable value is denoted as $\Delta$.

The control system 48 begins the algorithm at 50 as shown in FIG. 2. The control system 48 determines the input speed to the transmission 24, TS, and compares TS to a first threshold at 52. In one embodiment, the first threshold is $LP_{min}$. If TS is below the first threshold, the control system 48 proceeds to 54 and begins a sequence of examining driver intent or demand. If TS is above the first threshold, the control system 48 proceeds to 56, where it compares TS to a second threshold, such as the minimum speed to start the engine 12, $\omega_{eng\text{-}min}$.

Figure 3:
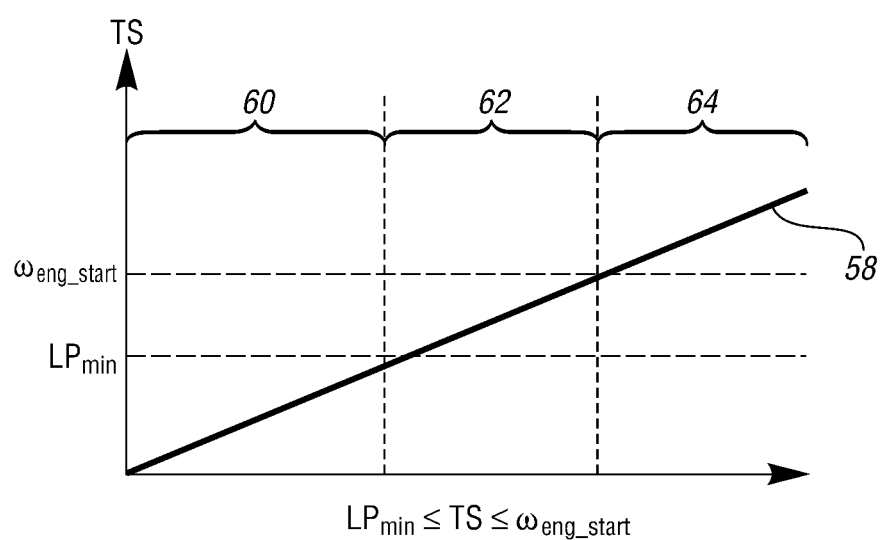
FIG. 3 is a graph illustrating zones of operation for the vehicle based on rotational speed of the driveline.

The various thresholds are shown in FIG. 3, which plots TS versus time. An example of a TS profile over time is shown as 58. In a first region 60, TS is below the first threshold, $LP_{min}$. In the first region 60, the auxiliary pump 38 provides pressurized fluid to the transmission 24 and limited actuators and gear ratios may be available in this region 60, which is factored into the various start sequences. In a second region 62, TS is between the first threshold, $LP_{min}$, and the second threshold, $\omega_{eng\text{-}start}$. In a third region 64, TS is above the second threshold, $\omega_{eng\text{-}start}$. In the second and third region, the main pump 36 provides pressurized fluid to the transmission 24 such that it may function in all of its design conditions. The gearbox input speed (TS) as shown in FIG. 3 is used as a first criteria for determining the use case and which start sequence to use.

In region 62, with the input speed, TS, is greater than $LP_{min}$, but less than the minimum speed allowed for engine start ($\omega$eng-start). The minimum speed for engine start is the lowest speed allowed for the engine 12 to operate for a start at low vehicle 10 speeds, and is typically above normal engine 12 idle speed (i.e., 1200-2000 rpm). For example, if the engine 12 is started at a low vehicle speed in region 60 or 62, then the launch clutch 22 is slipped to allow the M/G 14 and engine 12 speed to rise up to $\omega_{eng\text{-}start}$ (the M/G 14 and engine 12 may be locked together with an engaged disconnect clutch 18 after the start). The slip across the launch clutch 22 is maintained until TS rises (as the vehicle 10 speed increases) and is substantially synchronous with $\omega_{eng\text{-}start}$ at which point the launch clutch 22 may be engaged.

Referring back to FIG. 2, if TS<$LP_{min}$ at 52 (Region 60), then driver intent must be analyzed beginning at 54. The control system 48 determines if the gear selector is in park or neutral at 54. If the gear selector is in park or neutral, the controller 48 initiates a stationary start sequence where the launch clutch 18 is commanded open, the disconnect clutch 22 is stroked, the engine 12 is spun up using the M/G 14 or the starter motor 30 slipping torque through the clutch 22, the engine is fueled, and the disconnect clutch 18 is engaged when the M/G 14 speed and the engine 12 speed are substantially synchronous.

The use condition for a stationary start sequence may be vehicle 10 speed of zero, the gear lever in park or neutral, an open disconnect clutch 18, an open launch clutch 22, an engine speed of zero (off), an electric machine speed of zero (off), and a turbine speed (TS) of zero. The engine start may be requested by a non-driver demand source, such as a low battery SOC, a catalytic converter minimum temperature requirement, etc. The M/G 14 is put into a speed control mode and commanded to spin up to a nominal idling speed. The engine 10 may be started with the starter motor 30, or alternatively, the disconnect clutch 18 is commanded to transfer torque from the M/G 14 to start the engine spinning, combustion then is enabled, and the disconnect clutch is closed.

If the vehicle 10 is not in park or neutral at 54, the control system 20 proceeds to 68 and determines if there is a high driver demand, such as wide open throttle, or a throttle position within a specified range of wide open throttle. If a high driver demand exists at 68, the control system 20 initiates a high driver demand start or launch sequence at 70. The launch clutch 22 is slipped so that the motor speed is the engine start speed, $\omega_{eng\text{-}start}$, the disconnect clutch 18 is engaged rapidly, torque from the M/G 14 is used to pull up the engine 12 to $\omega_{eng\text{-}start}$ the engine 12 is fueled, and the launch clutch 22 is engaged.

The use condition for a high driver demand start or launch sequence 70 may be a vehicle speed of zero with a TS less than $LP_{min}$, the gear lever in drive or low, the accelerator pedal at zero or low throttle, the brake off, the disconnect clutch 18 open, the launch clutch 22 engaged, an engine speed of zero (off), and an M/G 14 speed of TS. The vehicle 10 may be stopped or just beginning to roll (TS<$LP_{min}$) in first gear with no or low driver demand with the M/G 14 producing propulsion torque. The driver then depresses the accelerator pedal to a high driver demand, such as a wide open or near wide open throttle, to induce an engine start. The launch clutch 22 is commanded to slip (in capacity control) and the disconnect clutch 18 is commanded to engage while M/G 14 torque is increased. The engine 12 starts to spin, and a start motor 30 may by engaged in parallel if one is present. The engine 12 is fueled and combustion is commanded. The launch occurs with the vehicle 10 accelerating while the TS rises until it matches the engine 12 speed, and then the launch clutch 22 is closed.

If there is not a high driver demand at 68, the control system 20 proceeds to 72 and determines if there is no driver demand from the accelerator pedal, such as when the vehicle 10 is creeping or stopped with the brake engaged. If no driver demand exists at 72, the control system 20 initiates a non driver demand start sequence at 74. The launch clutch 22 is slipped so that the M/G 14 speed is the engine 12 start speed, $\omega_{eng\text{-}start}$, the disconnect clutch 18 is stroked and slipped, torque from the M/G 14 or the starter motor 30 is used to pull up the engine 12 to $\omega_{eng\text{-}start}$ the engine 12 is fueled, the disconnect clutch 18 is engaged when the M/G 14 speed and the engine 12 speed are substantially synchronous, and the launch clutch 22 is then engaged.

The use condition for a non driver demand induced start or launch sequence 74 may be a vehicle speed of zero and a TS<$LP_{min}$, the gear lever in drive or low, no input to the accelerator pedal, the brake engaged or disengaged if creeping, the disconnect clutch 18 open, the launch clutch 22 engaged, an engine 12 speed of zero (off), and an M/G 14 speed of TS. The vehicle 10 may be stopped with the brake engaged or creeping with TS<$LP_{min}$ in 1st gear with the brake off and no driver demand. The M/G 14 is producing propulsion torque. An engine 12 start is requested by a non-driver demand source such as a low battery SOC, a catalytic converter minimum temperature requirement, or the like. The launch clutch 22 is commanded to slip (at capacity control) and the disconnect clutch 18 is commanded to slip (at capacity control) while the M/G 14 torque is increased, or alternatively, the starter motor 30 is engaged if present. The engine 12 is fueled, combustion is initiated, the engine 12 starts and is controlled to a synchronous speed. The disconnect clutch 18 is engaged to connect the M/G 14 and the engine 12 at a synchronous speed. The launch is finished when TS rises to match engine 12 speed, and the launch clutch 22 is then engaged.

If there is no driver demand or input at 72, the control system 20 proceeds to 76 and initiates a low speed start or launch start sequence at 76. The launch clutch 22 is slipped so that the M/G 14 speed is the minimum engine start speed, $\omega_{eng\text{-}start}$ the disconnect clutch 18 is slipped until the engine 12 speed is approximately equal to the motor speed, the engine 12 is fueled, the disconnect clutch 18 is engaged when the engine speed is above $\omega_{eng\text{-}start}$ and the launch clutch 22 is then engaged.

The use condition for a low speed start or launch sequence 76 may be a vehicle speed between zero and $LP_{min}$, the gear lever in drive or low, the accelerator pedal at a low or intermediate throttle position signifying low driver demand, the brake off, the disconnect clutch 18 open, the launch clutch 22 engaged, an engine 12 speed of zero (off), and an M/G 14 speed of TS. The vehicle 10 may be accelerating slowly in first gear with a low driver demand. The M/G 14 is producing propulsion torque for the vehicle 10 and an engine 12 start is requested by either a non-driver demand source or a low driver demand induced engine start. The launch clutch 22 is commanded to slip (in capacity control) and the disconnect clutch 18 is commanded to slip (in capacity control) while the M/G 14 torque is increased, or alternatively, the starter motor 30 is engaged if present. The engine 12 is fueled and combustion is initiated. The engine 12 is commanded to a synchronous speed with the M/G 14, and the disconnect clutch 18 is engaged to connect the M/G 14 and the engine 12 at a synchronous speed. The launch is finished after the vehicle accelerates while TS rises until it matches the engine speed, and the launch clutch 22 is then closed.

If TS>$LP_{min}$ at 52 (Region 62 or 64), then control system 48 proceeds to 56, where it compares TS to a second threshold, such as the minimum speed to start the engine 12, $\omega_{eng\text{-}min}$.

If TS is between the thresholds ($LP_{min}$<TS<$\omega_{eng\text{-}start}$, or Region 62), the controller 48 initiates a high speed start sequence at 78. The engine 12 is started quickly. The launch clutch 22 is slipped to allow the engine 12 to reach its minimum starting speed, but TS is above the minimum required for line pressure ($LP_{min}$). For sequence 78, the launch clutch 22 is slipped so that the motor speed is the engine start speed, $\omega_{eng\text{-}start}$, the disconnect clutch 18 is slipped, torque from the M/G 14 or the starter motor 30 is used to pull up the engine 12, the engine 12 is fueled, the disconnect clutch 18 is engaged when TS is approximately equal to the engine speed, and the launch clutch 22 is then engaged. The launch clutch 22 needs to slip enough to allow the M/G 14 speed to increase to the engine minimum start speed to pull up and start the engine 12.

The use condition for a high speed start or launch sequence 78 may be a vehicle 10 speed of TS with $LP_{min} \leq TS < \omega_{eng\text{-}start}$, the gear lever is in drive or low, the accelerator pedal is in a low or intermediate throttle position indicating low driver demand, the brake is off, the disconnect clutch 18 is open, the launch clutch 22 is engaged, the engine speed is at zero (off), and the M/G 14 speed is at TS. The vehicle 10 may be accelerating in first gear with a lower driver demand, and the M/G 14 is producing propulsion torque. An engine 12 start is requested by either a non-driver demand source or a driver demand induced engine start with any level of driver demand. The launch clutch 22 is commanded to slip (in capacity control) and the disconnect clutch 18 is commanded to slip (in capacity control) while the M/G 14 torque is increased, or alternatively, the starter motor 30 is engaged if one is present. The engine 12 is fueled and combustion is initiated. The engine 12 is commanded to a synchronous speed with the M/G 14, and the disconnect clutch 18 is engaged to connect the M/G 14 to the engine 12 at synchronous speed. The launch is finished after the vehicle 10 accelerates while TS rises until it matches the engine 12 speed, and then the launch clutch 22 is engaged.

If TS is not between the thresholds (TS>$\omega_{eng\text{-}start}$ or Region 64), the controller 48 initiates a rolling or no launch start sequence at 80. In this condition the vehicle 10 may be driving with the launch clutch 22 engaged. An engine 12 start in this use case is termed a rolling start, as the launch clutch 22 is fully engaged and TS is above any minimum value for line pressure or engine starting requirements. In process 80, the launch clutch 22 may be slipped slightly for torsional isolation, the disconnect clutch 18 is slipped, torque from the M/G 14 or the starter motor 30 is used to pull up the engine 12, the engine 12 is fueled, the disconnect clutch 18 is engaged when TS is approximately equal to the engine 12 speed, and the launch clutch 22 is then engaged.

The use condition for a rolling start sequence 80 may be a vehicle speed TS where $\omega_{eng\text{-}start} \leq TS$, the gear lever in drive or low, the accelerator pedal signifying no or low driver demand, the brake off, the disconnect clutch 18 open, the launch clutch 22 engaged, an engine speed of zero (off), and an M/G 14 speed of TS. The vehicle 10 may be driving in any gear with no or low driver demand with the M/G 14 producing propulsion torque. An engine 12 start is requested by either a non-driver demand source or driver demand induced engine start with any level of driver demand. The launch clutch 22 is commanded to slip (in capacity control), and the disconnect clutch 18 is commanded to slip (in capacity control) while the M/G 14 torque is increased, or alternatively, the starter motor 30 is engaged if one is present. The engine 12 is fueled and combustion is initiated. The engine 12 is commanded to a synchronous speed with the M/G 14. The disconnect clutch 18 is engaged to connect the M/G 14 and the engine 12 at a synchronous speed. The launch clutch 22 is commanded to engage.

Figure 4:
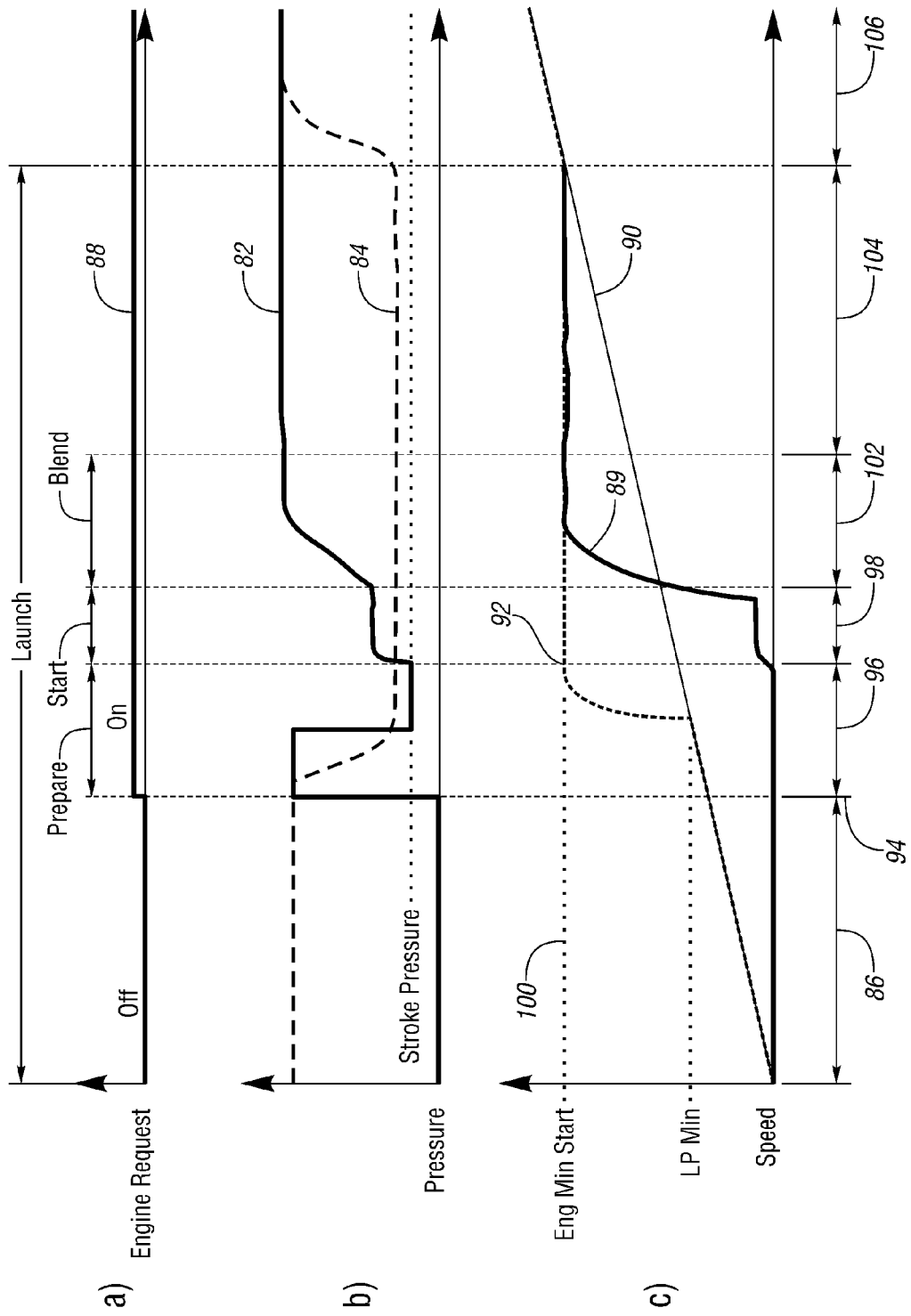
FIG. 4 is a graph illustrating a first start sequence for an engine in the vehicle if FIG. 1.

FIG. 4 illustrates an example of an engine 12 start in a vehicle 10 for a launch. FIG. 4a represents a command or signal graph illustrating an engine on request. FIG. 4b represents a pressure graph showing pressure commands or actual pressures for the launch clutch 22 and disconnect clutch 18. FIG. 4c represents rotational speeds of various components in the vehicle 10 including an engine 12 speed, a M/G 14 speed, and a TS speed or speed into the transmission 24. The TS speed may directly or indirectly correlate to the vehicle 10 speed. FIGS. 4a-c are plotted along the same x-axis representing time.

The pressure command or actual pressure for the launch clutch 22 is shown by line 84 in FIG. 4b. The pressure command or actual pressure for the disconnect clutch 18 is shown by line 82 in FIG. 4b. Initially, the launch clutch 22 is engaged and the disconnect clutch 18 is in an open position as can be seen in a first region 86 of FIG. 4.

In the first region 86, the engine 12 is off, as can be seen by the engine 10 command line 88 in FIG. 4a and the engine speed line 89 in FIG. 4c. The vehicle 10 is initially at rest. This may be indicated by the TS speed shown at line 90 in FIG. 4c. The M/G 14 is used to launch the vehicle 10 in an electric mode of operation, or in other words, the vehicle 10 begins to roll under electric power. Since the launch clutch 22 is engaged, the M/G 14 speed, shown at line 92 matches the TS speed 90 in region 86.

An engine on command as shown in line 88 is received at time 94. The control system 48 prepares for an engine 12 pull up. In region 96, the launch clutch 22 is slipped and the disconnect clutch 18 is stroked as can be seen by the pressure commands 82, 84, respectively. The M/G 14 speed increases in preparation for rotating the engine 12, as shown by line 92. The launch clutch 22 is slipped to provide a consistent torque delivery to the transmission 24 and the isolate driveline 26 disturbances.

In region 98, the disconnect clutch 18 pressure is increased as shown by line 82, in order to slip the clutch 18 and provide a torque transfer from the M/G 14 to rotate the engine 12. The M/G 14 has a speed of the minimum engine start speed 100. The engine speed increases as shown by line 89 and as the engine 14 starts, the engine speed increases.

In region 102, the engine 12 has started and meets it minimum start speed as shown by 89. The pressure command to the disconnect clutch 18 is increased and engaged by the end of region 102.

In region 104, the M/G 14 and the engine 12 are rotating at the minimum engine start speed as shown by 89, 92. However, the TS speed at 90, or the input speed into the transmission 24 and representative of the vehicle 10 speed is less than the minimum engine start speed 100. During region 104, the vehicle and TS speed 90 increases to the engine minimum start speed 100. Once the TS speed reaches the engine minimum start speed 100, region 106 begins and the launch clutch 22 may be engaged in a controlled manner as shown by line 84 to provide all of the torque from the engine 12 and the M/G 14 to the transmission 24. The engine 12 speed at 89, M/G 14 speed at 92, and TS speed 90 may all increase to continue to launch, accelerate, or drive the vehicle 10.

Figure 5:
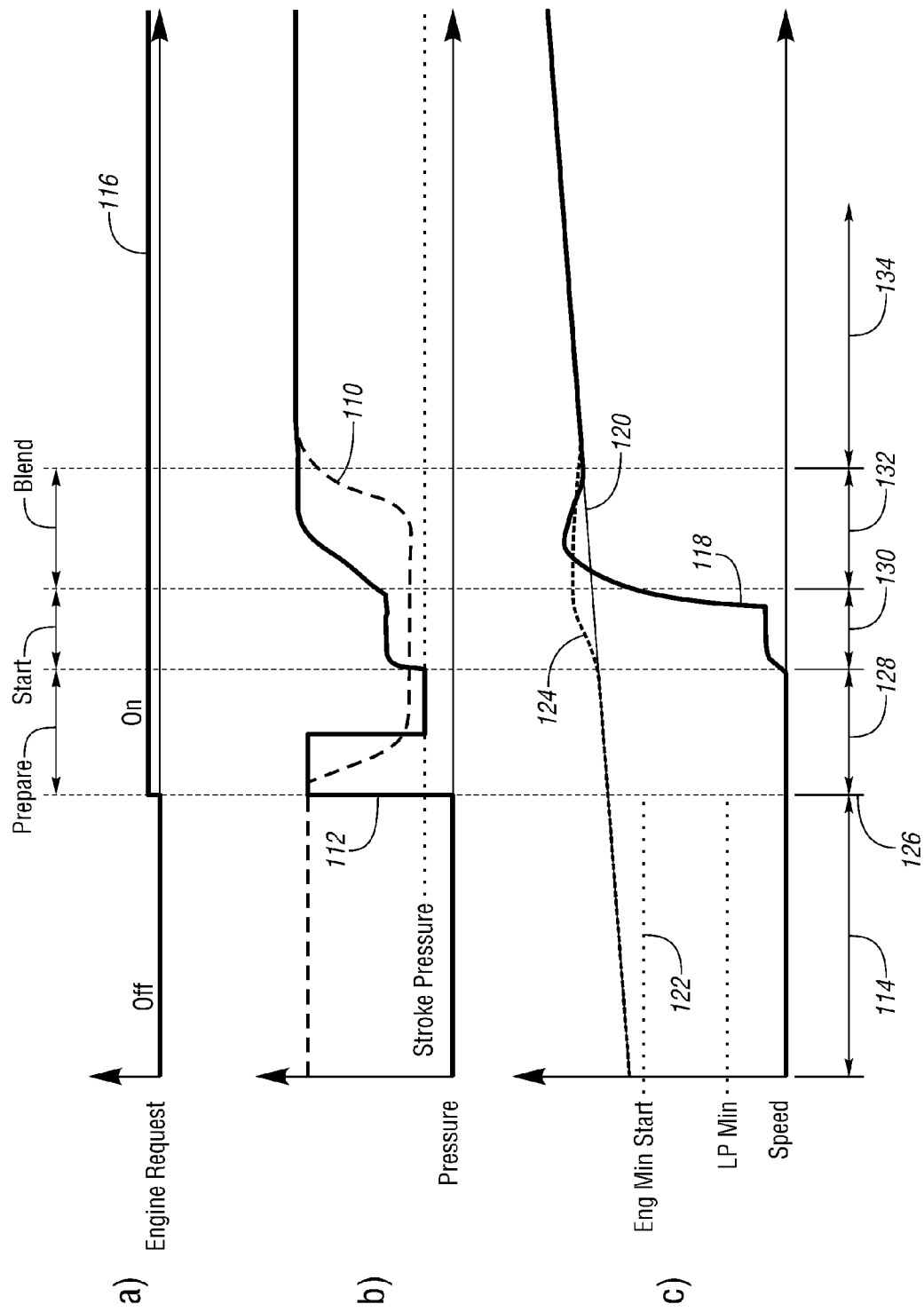
FIG. 5 is a graph illustrating a second start sequence for an engine in the vehicle of FIG. 1.

FIG. 5 illustrates an example of an engine 10 start in a vehicle 10 when the vehicle 10 is already in motion. FIG. 5a represents a command or signal graph illustrating an engine on request. FIG. 5b represents a pressure graph showing pressure commands or actual pressures for the launch clutch 22 and disconnect clutch 18. FIG. 5c represents rotational speeds of various components in the vehicle 10 including an engine 10 speed, a M/G 14 speed, and a TS speed or speed into the transmission 24. The TS speed may directly or indirectly correlate to the vehicle 10 speed. FIGS. 5a-c are plotted along the same x-axis representing time.

The pressure command or actual pressure for the launch clutch 22 is shown by line 110 in FIG. 5b. The pressure command or actual pressure for the disconnect clutch 18 is shown by line 112 in FIG. 5b. Initially, the launch clutch 22 is engaged and the disconnect clutch 18 is in an open position as can be seen in region 114 of FIG. 5.

In region 114, the engine 12 is off, as can be seen by the engine 10 command line 116 in FIG. 5a and the engine speed line 118 in FIG. 5c. The vehicle 10 is in motion. This may be indicated by the TS speed shown at line 120 in FIG. 5c. In the example of FIG. 5, the TS speed 120 is greater than the engine minimum start speed 122. The M/G 14 is being used to propel the vehicle 10 in an electric mode of operation. Since the launch clutch 22 is engaged, the M/G 14 speed, shown at line 124 matches the TS speed 120 in region 114.

An engine on command as shown in line 116 is received at time 126. The control system 48 prepares for an engine 12 pull up. In region 128, the launch clutch 22 is slipped and the disconnect clutch 18 is stroked as can be seen by the pressure commands 110, 112, respectively. The launch clutch 22 is slipped to provide a consistent torque delivery to the transmission 24 and the isolate driveline 26 disturbances.

In region 130, the M/G 14 speed increases in preparation for rotating the engine 12, as shown by line 124. The disconnect clutch 18 pressure is increased as shown by line 112, in order to slip the clutch 18 and provide a torque transfer from the M/G 14 to rotate the engine 12 using the excess speed and torque from the M/G 14 above that required through the clutch 22 to provide the TS speed 120. The engine begins to rotate as shown by line 118 and as the engine 14 starts, the engine speed increases.

In region 132, the engine 12 has started. The pressure command to the disconnect clutch 18 at 112 is increased and the clutch 18 engaged by the end of region 132. The pressure command to the launch clutch 22 also begins to increase at 110, and is engaged towards the end of region 132 or beginning of region 134. As the clutches 18, 22 are controlled, the engine 12 speed at 118 and M/G 14 speed at 124 are also commanded to a substantially similar speed, and are controlled to the TS speed 120.

In region 134, the launch clutch 22 is engaged in a controlled manner as shown by line 110 to provide all of the torque from the engine 12 and the M/G 14 to the transmission 24. The engine 12 speed at 118 and M/G 14 speed at 124 provide the TS speed 120 to continue to launch, accelerate, or drive the vehicle 10.

Various embodiments may be detected through observation of operation of the vehicle 10. For example, driver command signals, such as gear lever, accelerator pedal, brake pedal, etc., and actuator signals, such as engine and motor speeds, low voltage starter speed or electrical current, transmission speeds or pressures, etc., may be observed or obtained through existing vehicle information systems such as controlled area network (CAN) bus signals or measurements made through instrumenting the vehicle 10. An engine 10 start may be observed in operation that is similar to that shown in this disclosure for the same maneuver.

As such, various embodiments according to the present disclosure provide controlling an engine start in a hybrid vehicle. A control system uses existing conditions in the vehicle 10 and the driver command or intent to determine the control sequence or type of engine start that meets the vehicle requirements at the time. The control system then command and controls the various driveline components in the vehicle to start the engine, blend that various power sources, and operate the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A hybrid vehicle comprising: an engine; an electric machine connected to the engine by an upstream clutch; a transmission pump rotatably connected to the electric machine; a transmission gearbox connected to the electric machine by a downstream clutch; and a controller configured to start the engine using one of a plurality of start sequences that control the electric machine, the upstream clutch, and the downstream clutch, the engine start sequence being selected based on a driver demand input, and transmission gearbox input speed (TS) compared to a minimum speed (LP) to operate the transmission pump to generate a specified line pressure; wherein the controller is configured to start the engine when TS is less than LP when an engine start request is received and the driver demand input is null, the engine started by: slipping the downstream clutch, slipping the upstream clutch, increasing torque output from the electric machine to rotate the engine, fueling the engine, engaging the upstream clutch when engine speed and electric machine speed are substantially equal, and engaging the downstream clutch.

2. The vehicle of claim 1 further comprising a torque converter, wherein the downstream clutch is a bypass clutch for the torque converter.

3. The vehicle of claim 1 wherein the controller is configured to start the engine when TS is substantially zero and the gearbox is in a park or neutral state when an engine start request is received, the engine started by: opening the downstream clutch, operating the electric machine to rotate the engine, fueling the engine, and engaging the upstream clutch.

4. The vehicle of claim 1 wherein the controller is configured to start the engine when TS is less than LP when an engine start request is received and the driver demand input is high, the engine started by: slipping the downstream clutch, engaging the upstream clutch, increasing torque output from the electric machine to rotate the engine, fueling the engine, and engaging the downstream clutch.

5. The vehicle of claim 1 wherein the controller is configured to start the engine when TS is less than LP when an engine start request is received and the driver demand input is low, the engine started by: slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

6. The vehicle of claim 1 wherein the controller is configured to start the engine when TS is greater than the LP and less than a minimum engine start speed when an engine start request is received, the engine started by: slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

7. The vehicle of claim 1 wherein the controller is configured to start the engine when TS is greater than a minimum engine start speed and greater than LP when an engine start request is received, the engine started by: slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

8. A method for controlling a hybrid vehicle having an engine selectively coupled to an electric machine by an upstream clutch with the electric machine selectively coupled to a transmission gearbox by a downstream clutch, comprising:
starting the engine using a control sequence to control the electric machine, upstream clutch, and downstream clutch, the engine control sequence based on transmission gearbox input speed (TS), a driver demand input, a first threshold provided by a designated minimum rotational starting speed for the engine, and a second threshold provided by a minimum speed (LP) to operate a transmission pump to generate operational line pressure, the second threshold less than the first threshold.

9. The method of claim 8 wherein an output speed of the downstream clutch is the transmission gearbox input speed.

10. The method of claim 8 wherein the downstream clutch is a bypass clutch for a torque converter.

11. The method of claim 8 wherein TS is substantially zero and the driver demand input is null when an engine start request is received; and
wherein starting the engine comprises opening the downstream clutch, operating the electric machine to rotate the engine, fueling the engine, and engaging the upstream clutch.

12. The method of claim 8 wherein TS is less than the second threshold when an engine start request is received and the driver demand input is null; and
wherein starting the engine comprises slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

13. The method of claim 8 TS is less than the second threshold when an engine start request is received and the driver demand input is high; and
wherein starting the engine comprises slipping the downstream clutch, engaging the upstream clutch, increasing torque output from the electric machine to rotate the engine, fueling the engine, and engaging the downstream clutch.

14. The method of claim 8 wherein TS is less than the second threshold when an engine start request is received and the driver demand input is low; and
wherein starting the engine comprises slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

15. The method of claim 8 wherein TS is between the first and second thresholds when an engine start request is received; and
wherein starting the engine comprises slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

16. The method of claim 8 wherein TS is above the first threshold when an engine start request is received; and
wherein starting the engine comprises slipping the downstream clutch, slipping the upstream clutch, increasing torque output from the electric machine to rotate the engine, fueling the engine, engaging the upstream clutch when the engine speed and electric machine speed are substantially equal, and engaging the downstream clutch.

17. A method comprising: starting a hybrid vehicle engine using a sequence to control a M/G and upstream and downstream clutches connecting the M/G to the engine and a transmission gearbox, respectively, the sequence selected using a driver demand input, a relation between a transmission gearbox input speed (TS) and a minimum transmission pump speed (LP) to generate operational line pressure, and a relation between TS and a minimum engine rotational starting speed.

18. The method of claim 17 wherein TS is less than LP.

* * * * *